Oct. 16, 1934.　　　M. A. HARAM ET AL　　　1,977,058
CUTTER HEAD FOR BORING MACHINES
Filed Feb. 5, 1932
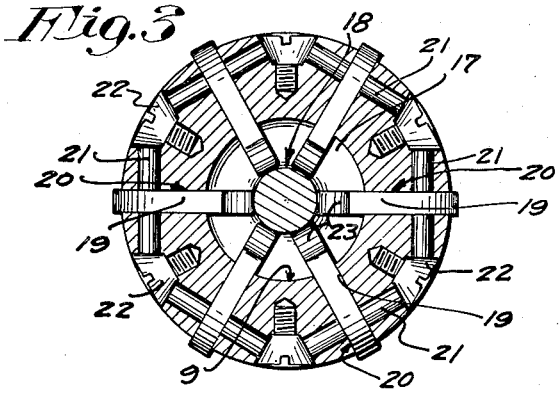
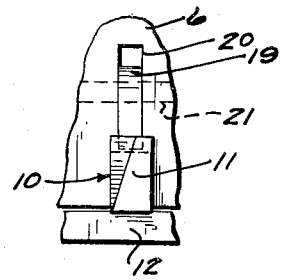
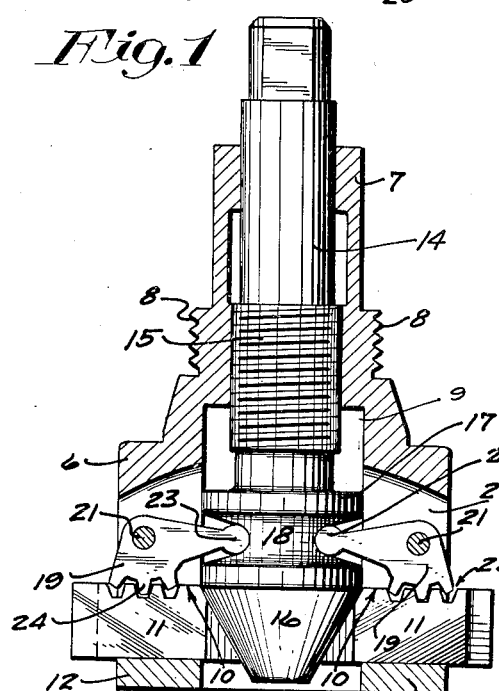
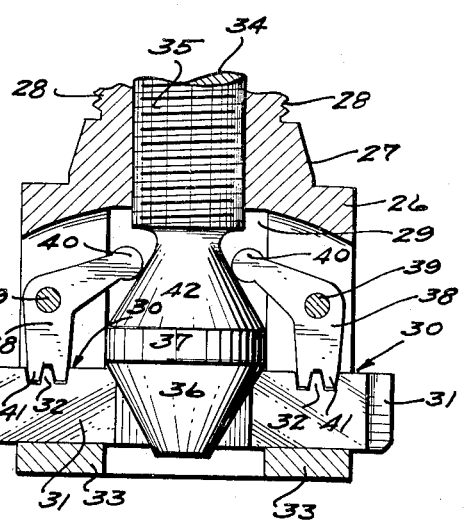
Inventors
Mikal A. Haram
John M. Lundell
By their Attorneys
Merchant and Gilmore Patented Oct. 16, 1934

1,977,058

UNITED STATES PATENT OFFICE 1,977,058

CUTTER HEAD FOR BORING MACHINES

Mikal A. Haram and John M. Lundell, Minneapolis, Minn., assignors to Storm Manufacturing Co., Inc., Minneapolis, Minn., a corporation of Minnesota Application February 5, 1932, Serial No. 591,035

4 Claims. (Cl. 77—58)

Our invention has for its object the provision of a simple and highly efficient cutter head intended for general use but especially well adapted for use in connection with a boring machine having operating and setting mechanism for the cutter blades of its cutter head, disclosed and broadly claimed in the United States applications of Thor Thorsen for Letters Patents entitled "Boring machine" filed January 20, 1932 under Serial Number 587,708 and "Cutter head for boring machines" filed January 20, 1932 under Serial Number 587,707, Patent No. 1,928,514 September 26, 1933.

To the above end, generally stated, the invention consists of the novel devices and combinations of devices hereinafter described and defined in the claims.

In the accompanying drawing, which illustrates the invention, like characters indicate like parts throughout the several views.

Referring to the drawing:

Fig. 1 is a view showing one form of the improved cutter head partly in elevation and partly in central longitudinal section;

Fig. 2 is a bottom plan view of the same;

Fig. 3 is a view partly in plan and partly in section taken on the line 3—3 of Fig. 1;

Fig. 4 is a fragmentary detail view in elevation of the cutter head and illustrating one of the cutters; and Fig. 5 is a fragmentary view showing another form of the improved cutter head, some parts being shown in full and other parts being shown in central longitudinal section.

Referring first to the invention shown in Figs. 1 to 4, inclusive, the numeral 6 indicates the cylindrical body of the cutter head having a reduced upper end portion 7 provided with external screw-threads 8 for detachably but rigidly securing said cutter head to the boring bar of a boring machine, not shown. Extending into the body 6 from the bottom thereof is a cylindrical recess 9 that is axially aligned with said body. Formed in the shell of the body 6 and at the bottom thereof are a plurality of notch-like seats 10, as shown six, which project radially from the axis of said body and are circumferentially spaced equal distances apart.

Mounted in each seat 10 for endwise sliding movement is a cutter blade 11 which is positively held by the walls of the body 6 at said seat against lateral or angular movements circumferentially of said body. These cutter blades 11 are held in the seats 10 by a friction ring 12 on the bottom of the body 6 and rigidly but detachably secured to said body by circumferentially spaced screws 13 which have threaded engagement with the body 6 and their heads are countersunk in the friction ring 12. This friction ring 12 bears directly on the under edges of the cutter blades 11, holds the upper edges thereof in direct contact with the body 6 and the purpose thereof is to produce a drag on the cutter blades 11 to hold the same against endwise movement except when positively moved, as will presently appear. The friction ring 12 is out of contact with the body 6 and by adjusting the screws 13 the pressure produced on the cutter blades 11 thereby may be varied, at will. Both sides of each cutter blade 11, at its inner end portion, are rearwardly tapered to a relatively sharp edge to afford clearance between said blades and permit the same to be retracted substantially entirely within the body 6.

The cutter blades 11 are positively projected by a pilot 14 which extends axially through the cutter head and has screw-threaded engagement therewith, as indicated at 15. This pilot 14 has on its lower end an inverted conical member 16 axially aligned therewith and provided with a relatively wide base 17 which has a working fit with the walls of the recess 9. Formed in the conical member 16 is a deep circumferentially extended groove 18 the bottom of which is segmental in cross-section and the side walls thereof flare upwardly. The inner ends of the cutter blades 11 are beveled to the same angle as the face of the conical member 16 and are directly engaged by said member during their projecting movement thereby. By turning the pilot 14 about its longitudinal axis in one direction the conical member 16 will be projected between the cutter blades 11 and when said pilot is turned in a reverse direction its conical member 16 will be retracted and permit said cutter blades to be likewise moved.

Independent connections, actuated by the pilot 14 during its axial movement, are provided for positively retracting the cutter blades 11. Said connections, as shown, include a bell-crank 19 for each cutter blade 11. The bell-cranks 19 work in contracted extensions 20 of the seats 10 and it is important that these extensions are narrower than the seats 10 to leave bearing surfaces on each side thereof for the cutter blades 11. These bell-cranks 19 are secured to the body 6 by pivot pins 21 on the intermediate portions of which said bell-cranks at their elbows are turnably mounted with a working fit. The pivot pins 21 are mounted in the body 6, extend circumferentially therearound and are endwise spaced, see Fig. 3.

To mount the pivot pins 21 in the seats therefor in the body 6, said body between the ends of adjacent pins, is provided with tapped holes in which screws 22 are removably mounted with their heads countersunk in the outer ends of said holes. These screws 22 have thick tapered heads that impinge against the ends of adjacent pivot pins 21 and hold the same against endwise movement. As shown in Fig. 3, the pivot pins 21 and heads of the screws 22 form a continuous ring within the body 6.

On the free end of the long arm of each bell-crank 19 is a disk-like head 23 which extends into the groove 18 and its periphery has a working fit with the bottom and side walls thereof. These heads 23 and the grooves 18 form a sort of a ball and socket joint between the pilot 14 and bell-cranks 19. Formed with the other or short arm of each bell-crank 19 is a toothed segment 24 which meshes with rack teeth 25 formed in the upper longitudinal edge portion of the respective cutter blade 11. It is highly important that there is sufficient play between the teeth on the segments 24 and the rack teeth 25 so that the bell-cranks 19 do not hold the cutter blades 11 out of contact with the conical member 16 and permit direct and positive contact of said member 16 with the beveled inner ends of the cutter blades 11.

The pilot 14 is rotated in either direction by an operating rod, not shown, the outer end of said pilot is shaped to receive one end of said rod and be held for common rotation therewith.

Referring now in detail to the cutter head shown in Fig. 5, the parts of which are substantially the same as those of the cutter head shown in Figs. 1 to 4, inclusive, with the exception of the connections between the pilot 14 and bell-cranks 19. The parts of the cutter head shown in Fig. 5 are designated as follows, to wit: The body 26, its extension 27, screw-threads 28, recess 29 and seats 30, the cutter blades 31 and their racks 32, the friction ring 33, the pilot 34, its screw-threads 35, conical member 36, and base 37, the bell-cranks 38, their pivot pins 39, heads 30 and toothed segments 41.

The bell-cranks 38 are actuated by a cam surface 42 on the pilot 34 between the screw-threads 35 and base 37. This cam surface 42 is in the form of a truncated cone which extends axially in an opposite direction from the conical member 36. The heads 40 on the bell-cranks 38 have direct peripheral contact with the cam surface 42. Obviously, during axial movement of the pilot 34 to retract its conical member 36 the movement of the cam surface 42 between the heads 40 of the bell-cranks 38 will turn said bell-cranks about the axes of their pivot pins 39 and cause the intermeshing teeth 32 and 41 to slide the cutter blades 31 radially inward. During the projection of the cutter blades 31 by the pilot 34 there is sufficient play between the intermeshing teeth 32 and 41 to permit direct and positive engagement of the conical member 36 with the inner beveled ends of the cutter blades 31.

The ratio of the number of threads 15 and the angle of the beveled surface of the member 16 is such as to project the cutter blades 31 a predetermined distance for each complete rotation of the pilot 34. This same statement applies to the cutter head shown in Fig. 5.

What we claim is:

1. A cutter head, an axially movable pilot in the head, a plurality of loose cutter blades mounted in the head for radial endwise sliding movement with respect to the axis of the pilot, said pilot having a cam with which the blades, at their inner ends, have direct engagement and operable to project the blades when the pilot is moved in one direction, bell-cranks actuated by the pilot for retracting the blades when the pilot is moved in a reverse direction, pins on which the bell-cranks are mounted for pivotal movement, said pins being removably mounted in seats in the head and held thereby in the same plane circumferentially spaced with respect to the axis of the pilot and with the ends of adjacent pins spaced apart, and means between the adjacent ends of the pins for holding said pins against endwise removal from the head.

2. A cutter head, a cutter blade slidably mounted in the head, an expanding device having an inclined surface arranged for movement in the head relative to the cutter blade, said device being operable in one direction to engage with the cutter blade to project the same, and lever means pivoted in the head and actuated by said device, when operated in another direction, to engage and retract said blade, said means having lost motion engagement with said cutter blade, whereby said means will not hold the cutter blade out of engagement with the expanding device when the expanding device is operated to project the cutter blade.

3. A cutter head, a cutter blade mounted in the head for endwise sliding movement, an expanding device having an inclined surface arranged for movement in the head relative to the cutter blade, said device being operable in one direction to engage with the cutter blade, at its inner end, to project the same, and a bell-crank pivoted in the head and actuated by said device, when operated in another direction, to engage and retract the cutter blade, said bell-crank having lost motion engagement with said cutter blade, whereby said bell-crank will not hold the cutter blade out of engagement with the expanding device when the expanding device is operated to project the cutter blade.

4. The structure defined in claim 3 in which the cutter blade and the bell-crank have intermeshing teeth with sufficient clearance to permit said lost motion.

MIKAL A. HARAM.
JOHN M. LUNDELL.